United States Patent
Miyazaki et al.

[11] Patent Number: 6,061,422
[45] Date of Patent: May 9, 2000

[54] X-RAY CT APPARATUS AND AN IMAGE RECONSTRUCTING METHOD FOR OBTAINING A NORMAL RECONSTRUCTED IMAGE BY ADDING WEIGHTS TO A PLURALITY OF PARTIAL RECONSTRUCTED IMAGES

[75] Inventors: Osamu Miyazaki, Ibaraki-ken; Tetsuo Nakazawa, Kashiwa, both of Japan

[73] Assignee: Hitachi Medical Corporation, Tokyo, Japan

[21] Appl. No.: 09/069,773

[22] Filed: Apr. 30, 1998

[30] Foreign Application Priority Data

Apr. 30, 1997 [JP] Japan .................................. 9-112302

[51] Int. Cl.$^7$ .................................................. A61B 6/03
[52] U.S. Cl. ................................. 378/15; 378/4; 378/901
[58] Field of Search ................................... 378/4, 15, 901

[56] References Cited

U.S. PATENT DOCUMENTS

| | | | |
|---|---|---|---|
| 4,446,521 | 5/1984 | Inouye | 378/14 |
| 5,216,601 | 6/1993 | Crawford et al. | 378/14 |
| 5,493,593 | 2/1996 | Müller et al. | 378/19 |

FOREIGN PATENT DOCUMENTS

| | | |
|---|---|---|
| 8-24252 | of 0000 | Japan . |
| 8-24253 | of 0000 | Japan . |
| B-1-23136 | of 0000 | Japan . |

*Primary Examiner*—David Vernon Bruce
*Attorney, Agent, or Firm*—Antonelli, Terry, Stout & Kraus, LLP

[57] ABSTRACT

An image reconstructing method in relation to an X-ray CT apparatus for shifting, sequentially by a predetermined angle, a reconstructed image for a projection angle in a predetermined range so as to obtain a continuous reconstructed image, in which one normal reconstructed image is obtained as follows: First, 180° amount of parallel beam projection data, which is obtained by converting fan beam measurement data into parallel beam data, is divided at a predetermined angle so as to obtain each partial reconstructed image for each partial segment. Then, weight-imposing is performed on the plurality of partial reconstructed images obtained, and the weight-imposed images are superposed, thus obtaining the one sheet of normal reconstructed image. At that time, concerning partial reconstructed images the view angles of which are in an opposing relationship to each other, a weighted average thereof is determined.

19 Claims, 9 Drawing Sheets

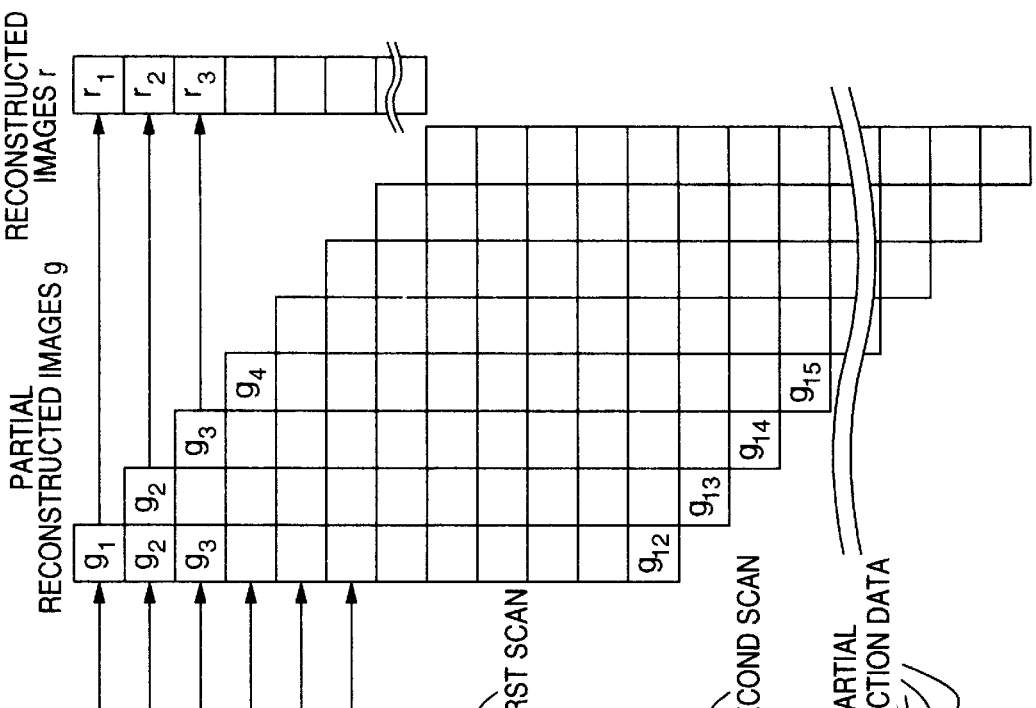
FIG.5C PRIOR ART
FIG.5B PRIOR ART
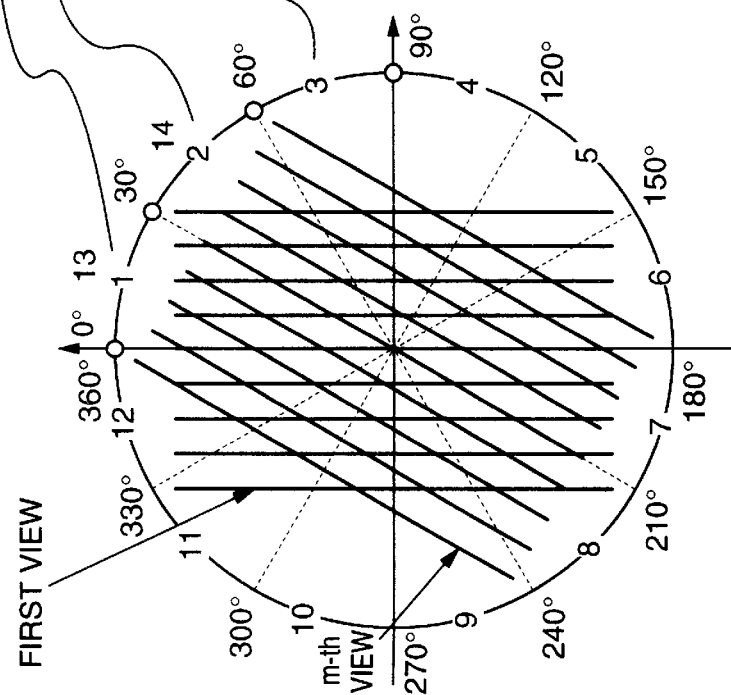
FIG.5A PRIOR ART

X-RAY CT APPARATUS AND AN IMAGE RECONSTRUCTING METHOD FOR OBTAINING A NORMAL RECONSTRUCTED IMAGE BY ADDING WEIGHTS TO A PLURALITY OF PARTIAL RECONSTRUCTED IMAGES

BACKGROUND OF THE INVENTION

The present invention relates to an X-ray CT apparatus and an image reconstructing method which, when continuously measuring an approximately same cross section, are suitable for obtaining at high speed a cross sectional (CT) image the artifact of which is reduced.

The X-ray CT apparatus has been widely used, and are being utilized in a variety of ways by users. In recent years, especially when endermicly performing an organization inspection of a lesion or a treatment therefor, the CT is getting more and more employed as a guide to a centesis. Performing such an operation under the guide by the CT, which makes it possible to reduce the time needed for the operation and at the same time to improve the accuracy thereof, is being considered to be a helpful and promising method.

For such a continuous observation of the CT image, it becomes necessary to reconstruct the image at high speed. Concerning such a high-speed image reconstructing method, several proposals have been made up to the present time.

In JP-B-1-23136, a second image having a time difference is obtained by obtaining difference amount between projection data used to reconstruct a first image and projection data needed to obtain a second image, and then adding a difference amount image, which is obtained by reconstructing the difference amount data, to the first image.

Disclosed in JP-A-8-24252 is a method in which a new cross sectional image, after reconstructing a first image, is obtained using the first image and a new image obtained by reconstructing projection data ((1/N) view: N indicates the number of division) which is insufficient to reconstruct a complete image. Disclosed in JP-A-8-24253 is a method similar to this.

All of the above-described methods, by partially reconstructing an image, make it possible to update the image at high speed. An ordinary scanning is a 360°/scan, and one cross sectional image is reconstructed from 360° amount of data. On the other hand, the technique disclosed in the JP-A-8-24252 makes it possible to obtain a completed sectional image by obtaining an image (i.e. a partial reconstructed image) by reconstructing projection data for every, for example, 30° and then adding necessary number (in the case of 30°, 12 images) of the partial reconstructed images.

FIG. 5A is a diagram showing a manner of parallel beam projection data in two views (Illustrated in the Figure are two views at 0° and 30°). Here, parallel projection datalization means that a fan beam X-ray is converted into a parallel beam in terms of the mathematical expressions. FIG. 5B is a diagram showing an embodiment of memory storing of projection data P ($P_1, P_2, \ldots$) divided in a unit of 30° as indicated by 0° to 30°, 30° to 60°, . . . .

FIG. 5C is a diagram showing an embodiment of memory storing of a partial reconstructed image g ($g_1, g_2, \ldots$) and a normal reconstructed image r ($r_1, r_2, \ldots$).

Here, the partial reconstructed image g means each of reconstructed images obtained from the parallel projection data in the width of 30°. The partial reconstructed image g1 means a reconstructed image obtained from the parallel projection data in a range of 0° to 30°, and the partial reconstructed image $g_2$ means a reconstructed image obtained from the parallel projection data in a range of 30° to 60°, and the other partial reconstructed images mean the same.

The normal reconstructed image r designates a 360° amount of reconstructed image obtained by composing (usually, adding) the plurality of partial reconstructed images g. Namely, the normal reconstructed image r means an ordinary CT image. The partial reconstructed image g which is obtained from the parallel projection data in the width of 30° does not constitute a complete image owing to the lack of data. Accordingly, the normal reconstructed image is obtained by adding the twelve partial reconstructed images g obtained in the width of 30°. Moreover, the addition of the partial reconstructed images in the width of 30° is performed sequentially. Such a sequential addition brings about an advantage of enabling the normal reconstructed images to be obtained one after another in real time. Incidentally, it is a well-known matter that the reconstruction can be executed through the addition.

Namely, in the FIG. 5C, a first normal reconstructed image $r_1$ is obtained by adding the partial reconstructed images from $g_1$ to $g_{12}$. A second normal reconstructed image $r_2$ is obtained by adding the partial reconstructed images from $g_2$ to $g_{13}$. The images from $g_2$ to $g_{12}$, which are needed for the second normal reconstructed image $r_2$, have been already determined when the first normal reconstructed image $r_1$ is obtained. Thus, what is newly required is only the image $g_{13}$. The image $g_{13}$ is obtained through a scanning in a range of 0° to 30° out of a next scanning in a range of 0° to 360°, without waiting for a finish of the next whole 360° amount of scanning. Consequently, the time needed to obtain the data becomes $\frac{1}{12}$th as compared with the one needed for the single whole scanning, and the normal image $r_2$ could be obtained by just adding the 30° amount of partial reconstructed image.

In this way, the second image $r_2$, if the thirteenth partial reconstructed image $g_{13}$ is further reconstructed, is obtained by adding the thirteenth image to an added partial reconstructed image obtained by adding the images from $g_2$ to $g_{12}$. Thus, it becomes possible to obtain a new cross sectional image in a time of summation of a time $\Delta t_1$ for reconstructing the one partial reconstructed image $g_{13}$ and a time $\Delta t_2$ for adding thereof, and in addition the time for the reconstruction is proportional to the number of back projection views. This makes it possible to reconstruct the one partial reconstructed image with a lapse of time about $\frac{1}{12}$th as compared with the time needed for the ordinary reconstruction, thus allowing a high-speed image reconstruction. If the time, i.e. $\Delta t_1 + \Delta t_2$, is equal to $\frac{1}{12}$th of the scanning time, it is possible to obtain the cross sectional images continuously in real time in parallel with the measurement. Concerning the third or after of normal reconstructed images $r_3$, $r_4$, too, the above-described description is given in much the same way.

A basic concept in any of these algorithms is increasing a speed. Meanwhile, an object to be scanned is, in many cases, moving in a real time CT scanning. The example is a monitoring of a centesis needle or a measured cross section at the time of the spiral scanning. In the above-described prior arts, however, no consideration was given to a suppression of the artifact which is a characteristic of the CT apparatus and appears when such a moving object is imaged.

Also, the artifact in the CT apparatus appears most outstandingly from a discontinuity in the data between the times of starting and finishing of the measurement. This is the point that the people concerned appreciate very well. For example, when reconstructing the image with the use of 180° amount of data, the problem is a discontinuity between the data at 0° and the one at 180° which are in an opposite relationship to each other in terms of the projection direction. Although correction algorithms for such a discontinuity have been already used, it is difficult to execute them in view of the operation time thereof. Accordingly, in the process for the real time reconstructed image, it was usual to omit the correction algorithms.

SUMMARY OF THE INVENTION

It is an object of the present invention to provide an X-ray CT apparatus and an image reconstructing method which, when performing a scanning continuously or continually, makes it possible to reduce an artifact as well as to reconstruct a continuous image at high speed.

In order to attain the above-mentioned object, the X-ray CT apparatus according to the present invention comprises a memory for storing a plurality of partial constructed images each of which corresponds to each of partial segments which are obtained by dividing a group of parallel beam projection data obtained by converting a fan beam at a predetermined projection angle, a plurality of multipliers for multiplying each of the plurality of divided constructed images by a predetermined weight coefficient, and a composer for composing outputs of the plurality of multipliers so as to obtain a normal reconstructed image.

In the present invention, a plurality number of images are sequentially selected out of the continuous partial reconstructed images so that a portion of the partial reconstructed images overlap, and the selected partial reconstructed images are multiplied by predetermined weight coefficients.

At that time, concerning the plurality number of selected partial reconstructed images, the weight coefficients are set so that a summation of weight coefficients for partial reconstructed images the view angles of which are in an opposing relationship to each other is equal to a summation of weight coefficients for the other partial reconstructed images.

Also, when employing 180° amount of partial reconstructed images and obtaining a reconstructed image with the use of a recursive filter, weights given to the images by the recursive filter are determined so that a summation of weights for partial reconstructed images the view angles of which are in an opposing relationship to each other becomes equal to 1.

The present invention, when performing a scanning continuously or continually using an X-ray CT apparatus, makes it possible not only to reconstruct a continuous image at high speed but also to reduce the artifact or a noise even at the time of scanning with an ultra low radiation dose such as a biopsy under a guide by the CT apparatus. Furthermore, the present invention allows a frame rate (images-per-second) to be freely varied, thus making it possible to freely select or set the frame rate in correspondence with objects of display, diagnosis, and so on.

BRIEF DESCRIPTION OF THE DRAWINGS

FIGS. 2A and 2B are diagrams showing embodiments of weight coefficients set in the X-ray CT apparatus according to the present invention;

FIGS. 3A through 3C are diagrams showing other embodiments of weight coefficients set in the X-ray CT apparatus according to the present invention;

FIGS. 5A through 5C are diagrams for explaining a prior art embodiment concerning an X-ray CT apparatus;

DESCRIPTION OF THE PREFERRED EMBODIMENTS

Figure 4:
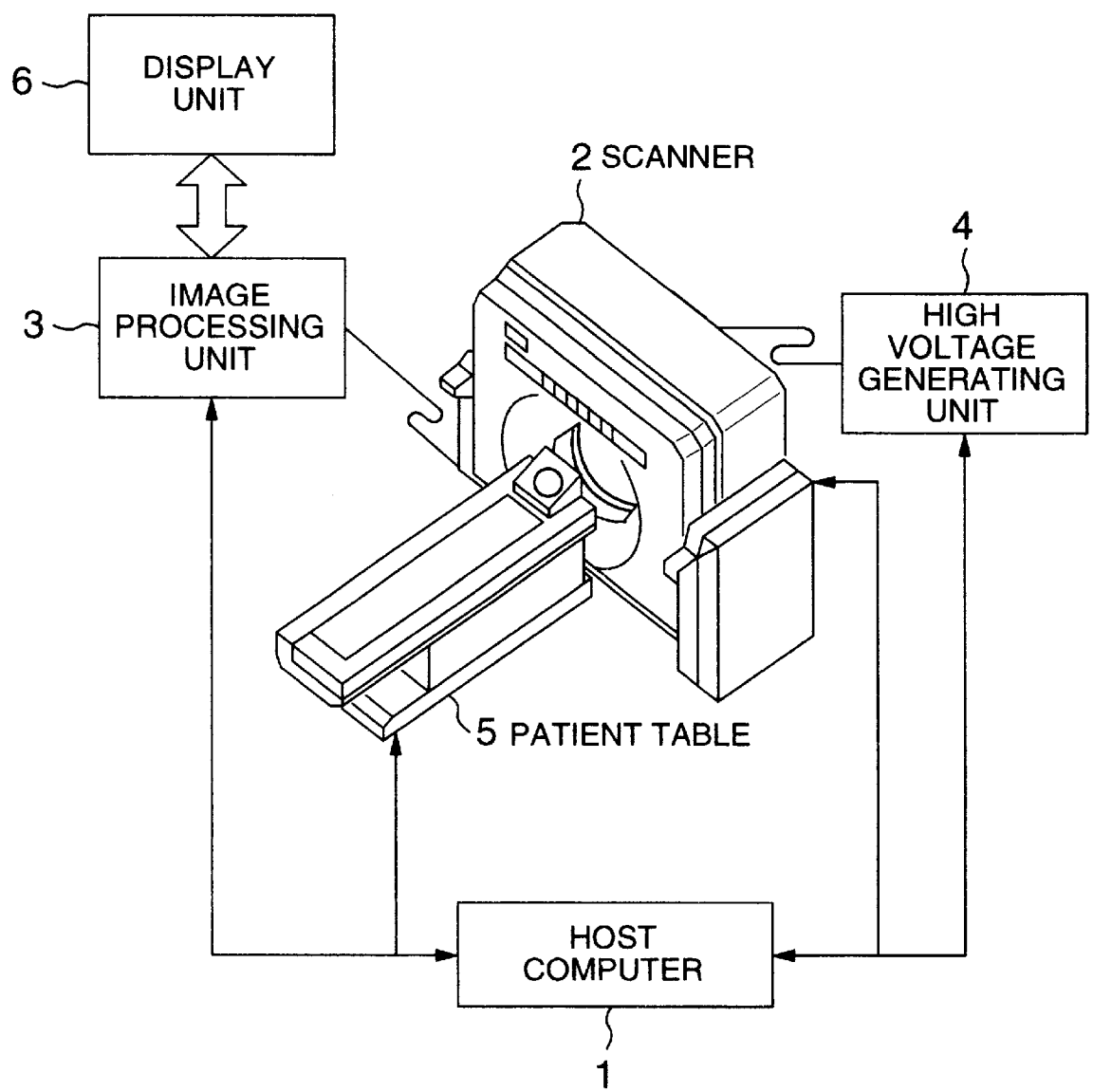
FIG. 4 is a diagram showing a whole configuration of the X-ray CT apparatus according to the present invention.

FIG. 4 shows a fan beam X-ray CT apparatus in the present embodiment. The fan beam X-ray CT apparatus comprises a host computer 1 for controlling the whole system, a scanner 2 on which mounted are systems such as an X-ray generating system and an X-ray detecting system and which is capable of performing a 1-second-per-rotation of continuous scanning through a slip ring, an image processing unit 3 in charge of a preprocessing, an image reconstructing processing and a variety of analyzing processings, a high voltage generating unit 4 for supplying an X-ray with a high voltage, a patient table 5, and a display unit 6.

The host computer 1 controls the high voltage generating unit 4 and the patient table 5 in accordance with an arranged planning for a scanning. When a preparation for the scanning is over and a measurement of an object to be inspected is started, measured projection data is sequentially transferred to the image processing unit 3 so as to carry out the reconstruction, and then the reconstructed image is displayed on the display unit 6.

Figure 1:
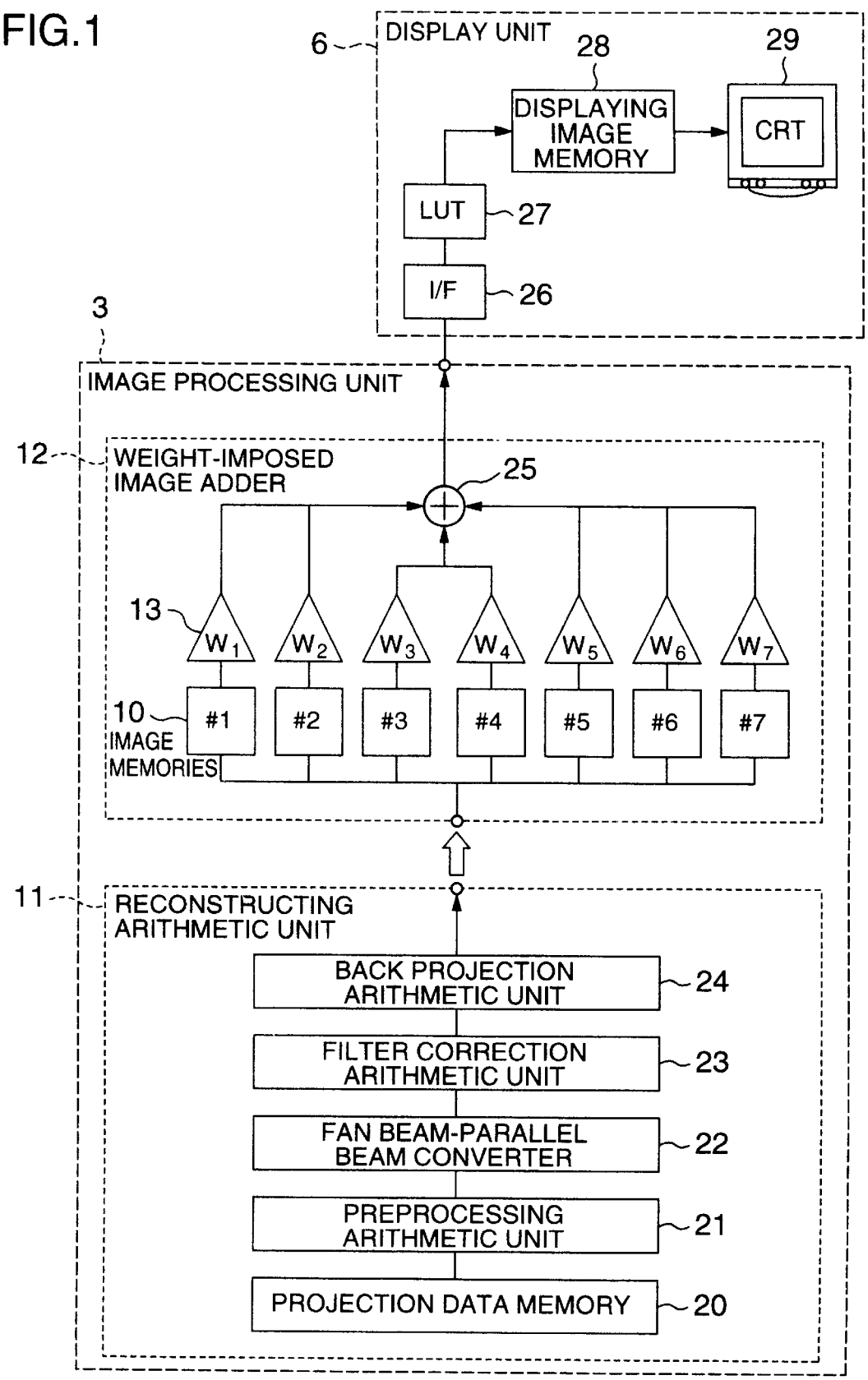
FIG. 1 is a configuration diagram showing an embodiment of a main part in an X-ray CT apparatus according to the present invention.

FIG. 1 is a diagram showing an embodiment of inside configurations of the image processing unit 3 and the display unit 6. The image processing unit 3 comprises a reconstructing arithmetic unit 11 and a weight-imposed image adder 12. The display unit 6 comprises an input interface 26, a LUT (Lookup Table) 27, a displaying image memory 28, and a CRT 29.

The reconstructing arithmetic unit 11 comprises a projection data memory 20, a preprocessing arithmetic unit 21, a fan beam-parallel beam converter 22, a filter correction arithmetic unit 23, and a back projection arithmetic unit 24.

The weight-imposed image adder 12 comprises seven units of image memories 10 (i.e. #1 to #7), seven units of weight coefficient multipliers 13 (reference notations $W_1$ to $W_7$ designate the weight coefficients), and an image composer 25.

The image processing unit 3 shown in FIG. 1 is capable of reconstructing one image in, for example, less than one second. This is made possible by the following reasons: The partial reconstructed images are obtained in the width of 30° one after another sequentially, and in addition one reconstructed image can be obtained by adding one newest partial reconstructed image, which has been newly obtained in the width of 30°, to images obtained in the previous reconstruction. For example, in the 30° width of angle updating, 12-images-per-second of reconstructed images can be obtained.

The reconstructing arithmetic unit 11 shown in FIG. 1 obtains the reconstructed image by performing a preprocessing made by the arithmetic unit 21, a conversion to a parallel beam made by the converter 22, a filter correction processing made by the arithmetic unit 23, and a back projection arithmetic operation made by the arithmetic unit 24. This reconstructing arithmetic operation, which differs from the 360° amount of batch-type reconstructing arithmetic operation, obtains the partial reconstructed images from parallel beam data in a width of a partial angle (for example, in the width of 30°).

The weight-imposed image adder 12 allots, one by one, the partial reconstructed images ($g_1$, $g_2$, . . . ), which are obtained one after another by the arithmetic unit 11, to each of the image memories 10, i.e. #1 to #7. For example, the partial reconstructed image $g_1$ is allotted to the image memory #1, $g_2$ is allotted to #2, . . . , and $g_7$ is allotted to #7. Then, the partial reconstructed images are stored, respectively. Concerning the remainder, i.e. the partial reconstructed images $g_8$, $g_9$, . . . , the allotment is carried out in such a manner that $g_8$ is allotted to #1 instead of $g_1$, $g_9$ is allotted to #2 instead of $g_2$, . . . , and then the storing is executed.

The weight coefficient multipliers 13, making the weight coefficients, i.e. $W_1$ to $W_7$, correspond to the partial reconstructed images stored in the image memories, i.e. #1 to #7, multiply each of the partial reconstructed images by each of the weight coefficients, thus performing a weight-imposing on each of the partial reconstructed images. The composer 25 performs a total addition thereof, thus obtaining one reconstructed image.

Here, although the number of the memories 10 is set to be seven, it may be, at least, six as long as the width in which the partial reconstructed image is obtained is, basically, 30°. The reason why it may be at least six is that a half scanning (180°) makes it possible to obtain one reconstructed image. (i.e. 180°=an amount of 30°×6) The employment of the half scanning results in the following advantages: The memory capacity is allowed to be smaller as compared with the 360° amount of scanning. The number of the addition made by the composer 25 is also allowed to be smaller, which enables the reconstruction to be performed at higher speed. Since an rotation angle needed for the half scanning is one-half of 360° (i.e. an amount of 180°), the reconstruction is possible by means of a measurement which takes half the time of the 360° amount of scanning. In this case, with a 1-second-per-rotation (which is also referred to as 1-second scanning) of scanner, it becomes possible to output twelve weight-imposed added reconstructed images in a second (Namely, the frame rate becomes 12-images-per-second. A frame rate means the number of reconstructed images which can be obtained in a unit of time.) Incidentally, the amount of 180° means an amount of 180° in the case of the parallel beam. An amount of 180° in the case of the fan beam results in data which is insufficient to perform the reconstruction, and thus 180° in the fan beam is replaced by 180°+α. Also, the parallel beam may be whichever of the one with an equal interval and the one with an unequal interval.

Described below are how to use the image memories 10 (#1 to #7), which is of fundamental importance in the present invention, and embodiments as to how the weight coefficients $W_1$ to $W_7$ are set.

(1) An embodiment in which the weight coefficients are set to be $W_1=W_2=$ . . . $=W_6=1$ and $W_7=0$.

Figures 2A, 2B:
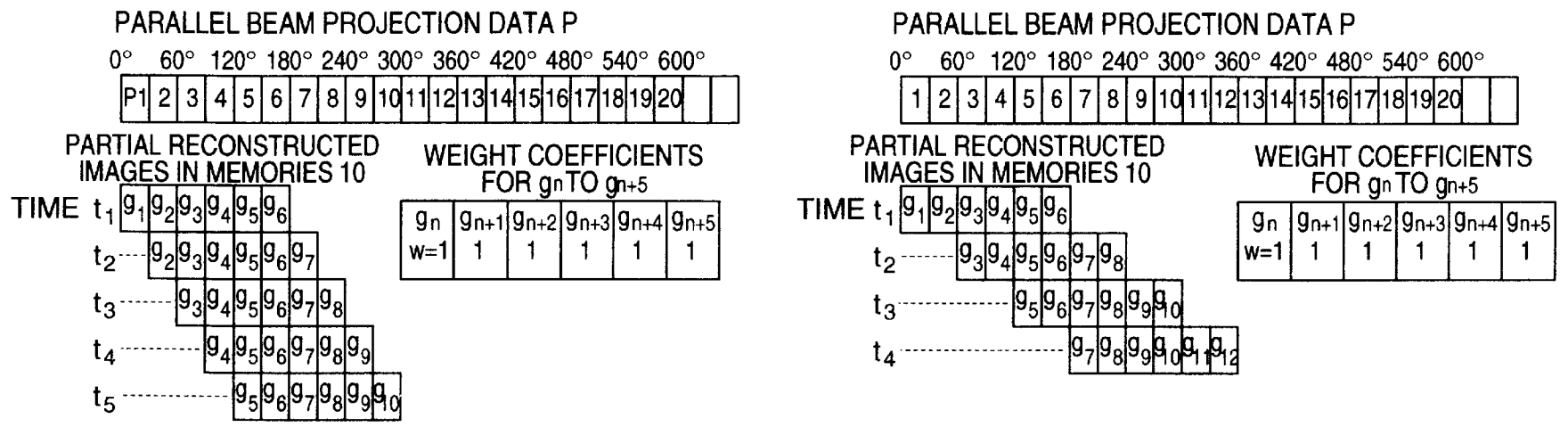

FIG. 2A shows this embodiment.

In FIG. 2A, parallel beam projection data P ($P_1$, $P_2$, . . . ) is an output from the fan beam-parallel beam converter. Partial reconstructed images $g_1$, $g_2$, . . . are obtained from each of the parallel beam projection data $P_1$, $P_2$, . . . . Weight coefficients for $g_n$ to $g_{n+5}$ are weight coefficients for partial reconstructed images $g_n$ to $g_{n+5}$ which are used for obtaining a normal reconstructed image $r_n$.

(a) The steps at which a first reconstructed image $r_1$ is obtained are as follows: A partial reconstructed image $g_1$ in a range of 0° to 30° is stored in #1 of the image memories 10. Then, a partial reconstructed image $g_2$ in a range of 30° to 60° is stored in #2 of the image memories 10. Similarly, an image $g_3$ is stored in #3, an image $g_4$ is stored in #4, an image $g_5$ is stored in #5, and an image $g_6$ is stored in #6. Nothing is stored in #7. After the storing into #1 to #6 is over, the images stored in #1 to #6 are fetched through the multipliers 13 so as to be added by the composer 25, thus obtaining the normal reconstructed image $r_1$ through a half scanning in a range of 0° to 180°.

(b) Next, a partial reconstructed image $g_7$ in a range of 180° to 210° is stored in #1. At that time, by clearing in advance the image $g_1$ stored at step (a), the image $g_7$ is stored instead of $g_1$. Still next, the images $g_7$, $g_2$ to $g_6$ stored in #1 to #6 are read out through the multipliers 13 so as to be added by the composer 25, thus obtaining a next normal reconstructed image $r_2$.

(c) Further, a partial reconstructed image $g_8$ in a range of 210° to 240° is stored in #2. Naturally, the image $g_2$ stored previously in #2 is cleared in advance. Similarly, the images $g_7$, $g_8$, $g_3$ to $g_6$ are added by the composer 25, thus obtaining a still next normal reconstructed image $r_3$.

(d) Hereinafter, in much the same way, normal reconstructed images $r_4$, $r_5$, . . . are obtained one after another. The above-mentioned steps make it possible to calculate the second normal reconstructed image $r_2$ during a short period determined by a time elapsed between obtaining the image $r_1$ and obtaining the image $g_7$ (obtaining the image $g_7$ is achieved immediately after obtaining parallel data in an amount of 30° from 180° to 210°.) and a time needed to add the images. The steps also allow normal reconstructed images $r_3$, $r_4$, . . . to be calculated in such a short period.

(2) An embodiment in which data the view angles of which are opposing are averaged.

Figures 3A, 3B, 3C:
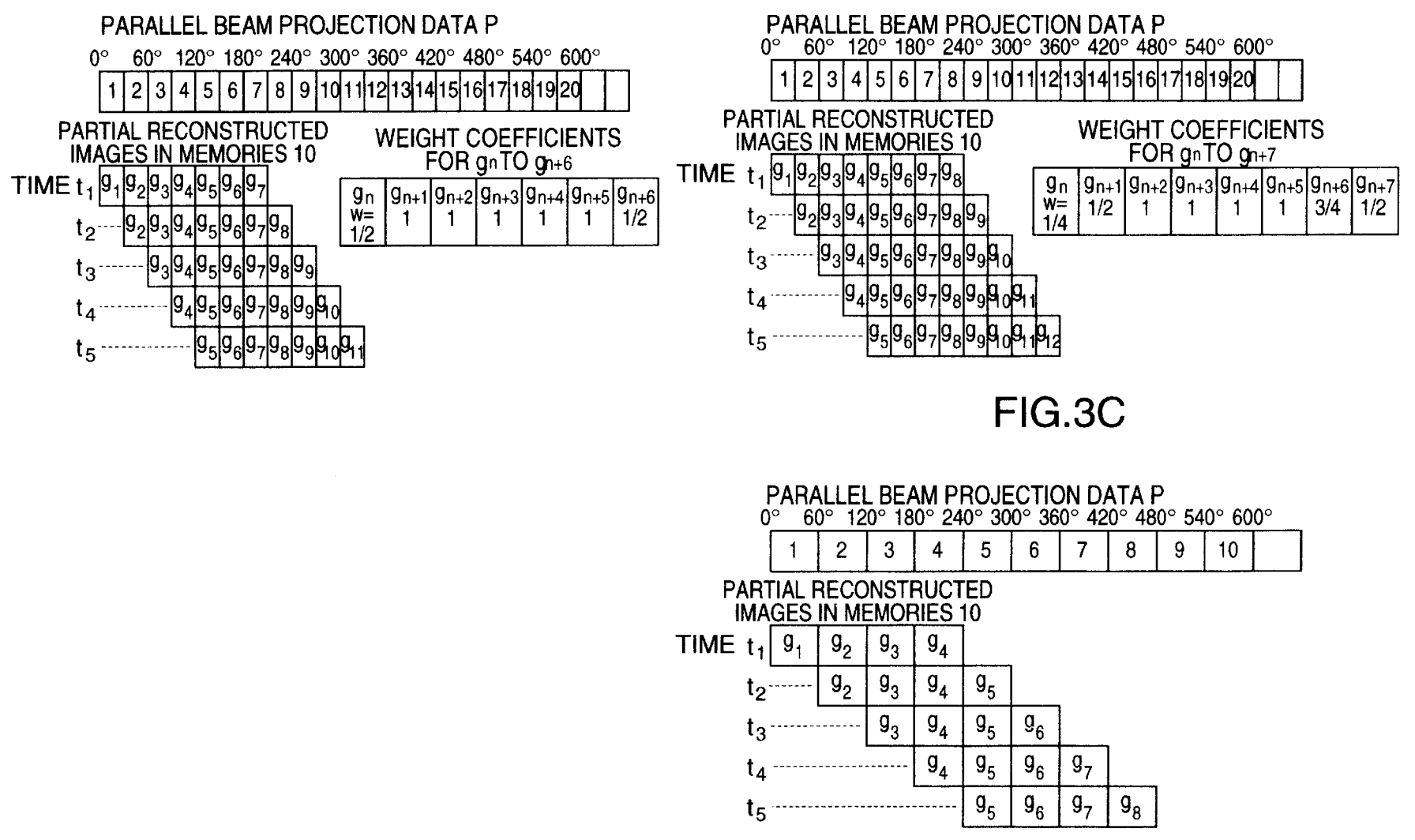
Figure 9A:
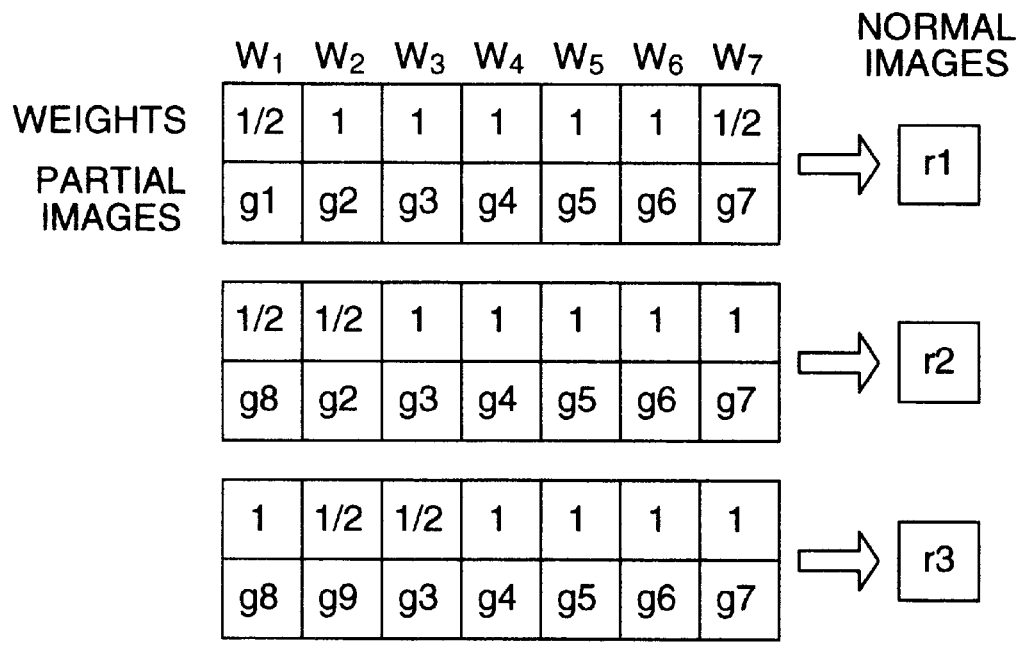
FIGS. 9A and 9B are diagrams showing variations in the weight coefficients for partial reconstructed images in FIGS. 3A and 3B.

FIGS. 3A and 9A show this embodiment. FIG. 9A indicates variations in weight coefficients for partial reconstructed images in FIG. 3A.

(a) The embodiment is an embodiment in which the weight coefficients $W_1$ to $W_7$ are varied every time a 30° amount of partial reconstructed image is obtained. The variation is carried out in such a manner that, concerning partial reconstructed images the view angles of which are in an opposing relationship to each other, a summation of weight coefficients thereof becomes equal to 1.

This weight-imposing is performed by taking a weighted average of data in an opposing relationship to each other so as to reduce an artifact at an end part.

(b) First, in order to obtain a first reconstructed image $r_1$ in a range of 0° to 180° (Although this differs in content from $r_1$ in FIGS. 2A and 2B, the same reference notation is employed. This will also be held hereinafter.), the weight coefficients are set as $W_1=W_7=\frac{1}{2}$ and $W_2$ to $W_6=1$. In this case, $g_1$ and $g_7$ are in an opposing relationship to each other. Under this setting, a partial reconstructed image $g_1$ in a range of 0° to 30° is stored in #1. Hereinafter, partial reconstructed images $g_2$ in a range of 30° to 60°, $g_3$ in a range of 60° to 90°, . . . , and $g_7$ in a range of 180° to 210° are stored in #2, #3, and #7, respectively. Then, the images are read out and, after weight-imposing multiplications thereto are performed by the multipliers 13, are added by the composer 25, thus obtaining the normal reconstructed image $r_1$. In connection with the image $r_1$, the image $g_1$ and the image $g_7$ are data in an opposing relationship to each other. The opposing data are added and then converted into the one-half thereof so as to obtain a weighted average value thereof. This results in a decrease in a discontinuity at the end part, thus making it possible to reduce the artifact due to the discontinuity at the end part.

(c) Next, in order to obtain a second reconstructed image $r_2$, the weight coefficients are set to be $W_1=W_2=\frac{1}{2}$ and $W_3$ to $W_7=1$. In this case, $g_2$ and $g_8$ are in an opposing relationship to each other. Under this setting, a partial reconstructed image $g_8$ in a range of 210° to 240° is stored in #1. At that time, the image $g_1$ stored previously in #1 is cleared. Still next, concerning the images $g_8, g_2, g_3, \ldots,$ and $g_7$, the composer 25 performs the addition thereof through the multipliers 13. The image $g_8$ and the image $g_2$, which, in this case, are in an opposing relationship to each other, undergo the weighted average, thus obtaining the image $r_2$ at the end part of which the discontinuity is reduced.

(d) In order to obtain an image $r_3$, the weight coefficients are set to be $W_2=W_3=\frac{1}{2}$, $W_1=1$, and $W_4$ to $W_7=1$. In this case, $g_3$ and $g_9$ are in an opposing relationship to each other. In order to obtain an image $r_4$, the weight coefficients are set to be $W_3=W_4=\frac{1}{2}$, $W_1=W_2=1$, and $W_5$ to $W_7=1$. Hereinafter, in much the same way, every time the reconstructed image is obtained sequentially, the weight coefficients are varied during a short time period for the switching.

(3) An embodiment in which one reconstructed image is obtained every time two partial reconstructed images are obtained, and the weight coefficients are set to be $W_1$ to $W_6=1$ and $W_7=0$.

FIG. 2B shows this embodiment.

(a) In order to obtain a first reconstructed image r1, partial reconstructed images $g_1$ in a range of 0° to 30°, $g_2$ in a range of 30° to 60°, ..., and $g_6$ in a range of 150° to 180° are stored in #1, #2, ..., and #6, respectively. Then, the images are read out and added, thus obtaining the image $r_1$. The steps until here are the same as those in the embodiment in FIG. 2A.

(b) In order to obtain a second reconstructed image $r_2$, a partial reconstructed image $g_7$ in a range of 180° to 210° is stored in #1. In FIG. 2A, the addition for the reconstruction is performed after this. In the present embodiment, however, instead of performing the addition at this time, an image $g_8$ in a range of 210° to 240° is stored in #2. At the instant when the new images $g_7$ and $g_8$ have been obtained, the images $g_7$, $g_8$, and $g_3$ to $g_6$ are added, thus obtaining the reconstructed image $r_2$.

(c) Hereinafter, in much the same way, every time continuous two partial reconstructed images are obtained, the addition for the reconstruction is performed so as to obtain reconstructed images $r_3, r_4, \ldots$.

Figure 9B:
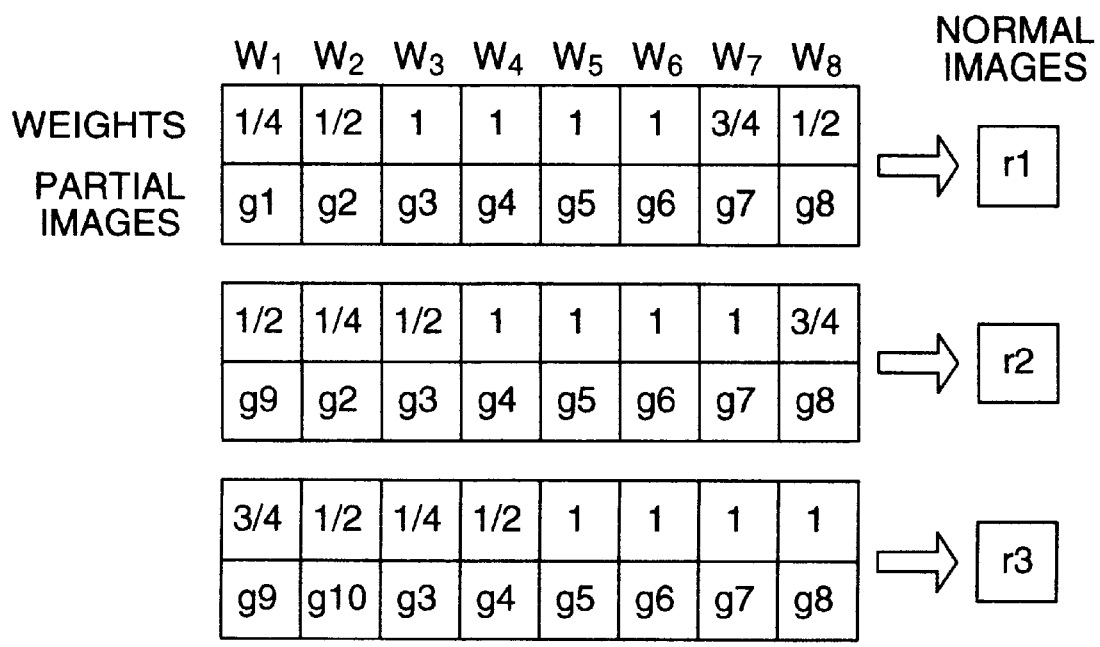

(4) An embodiment which FIGS. 3B and 9B show is an embodiment in which a discontinuity at an end part is reduced even further. FIG. 9B indicates variations in weight coefficients for partial reconstructed images in FIG. 3B. In this embodiment, there are prepared eight units of image memories 10 (i.e. #1 to #8), and eight units of weight coefficient multipliers 13 for multiplying by the weight coefficients $W_1$ to $W_8$.

(a) First, when obtaining a first reconstructed image $r_1$, the weight coefficients are set to be $W_1=\frac{1}{4}$, $W_7=\frac{3}{4}$, $W_2=\frac{1}{2}$, $W_8=\frac{1}{2}$, and $W_3$ to $W_6=1$. In this case, $g_1$ and $g_7$ are in an opposing relationship to each other, and $g_2$ and $g_8$ are in an opposing relationship to each other, respectively. Partial reconstructed images $g_1$ in a range of 0° to 30°, $g_2$ in a range of 30° to 60°, ..., $g_7$ in a range of 180° to 210°, and $g_8$ in a range of 210° to 240° are stored in #1, #2, ..., #7, and #8, respectively. Then, the images are read out and added through the multipliers 13, thus obtaining the image $r_1$.

(b) When obtaining a second reconstructed image $r_2$, the weight coefficients are set to be $W_1=W_3=\frac{1}{2}$, $W_2=\frac{1}{4}$, $W_8=\frac{3}{4}$, and $W_4$ to $W_7=1$. In this case, $g_2$ and $g_8$ are in an opposing relationship to each other, and $g_3$ and $g_9$ are in an opposing relationship to each other, respectively. A partial reconstructed images $g_9$ in a range of 240° to 270° is stored in #1 and added, thus obtaining the image $r_2$. Hereinafter, in much the same way, images $r_3, r_4, \ldots$ are obtained.

As examples of weight coefficients imposed on partial reconstructed image data being in an opposing relationship to each other, a variety of imposing distributions can be considered under a condition that a summation of the weight coefficients is equal to 1. In particular, when the real time performance is important, it is desirable to increase weight coefficients for the most up-to-date data.

(5) An embodiment in which a partial segment is 60°, instead of 30°.

FIG. 3C shows this embodiment. This is characterized by the partial segment of 60°. In order to add data the view angles of which are in an opposing relationship, parallel projection data being in an opposing position (for example, 0° to 60° as opposed to 180° to 240°) are arranged to be stored in the image memories 10. Meanwhile, it is allowable that the number of the image memories 10 is four (i.e. #1 to #4).

Of the above-described embodiments, the embodiments (2), (4), and (5) find it necessary to set the weight coefficients for each frame. There is, however, a method which makes it possible to attain the same objects without employing such methods. The method is a recursive filtration of the configuration shown in FIG. 1.

Figure 6:
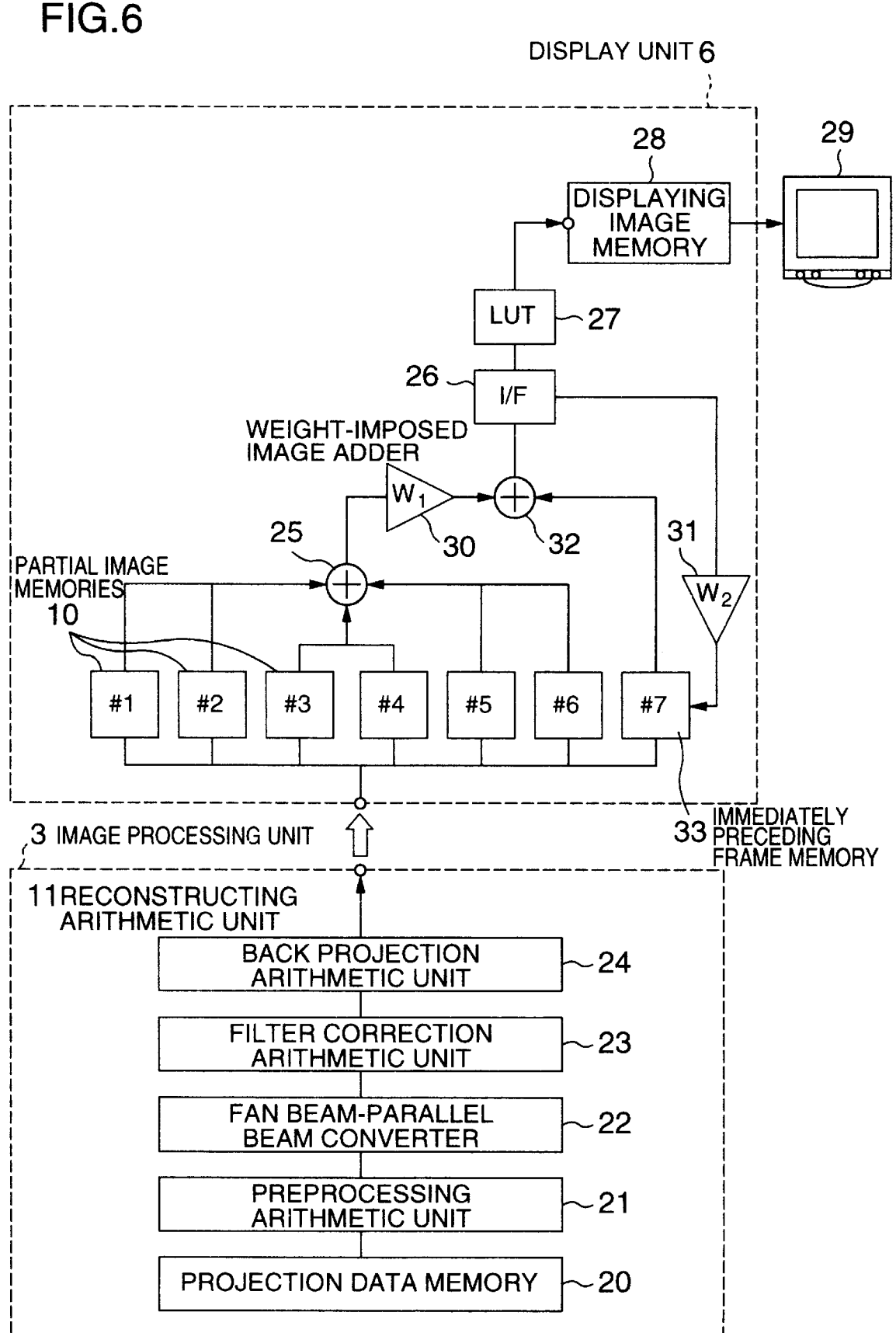
FIG. 6 is a configuration diagram showing another embodiment of a main part in the X-ray CT apparatus according to the present invention.

FIG. 6 is a configuration diagram of a recursive filter. What differs from the configuration in FIG. 1 is as follows: The number of the image memories 10 is set to be six (#1 to #6). Employed as seventh memory #7 is an immediately preceding frame memory 33, and newly provided are multipliers 30, 31 and a composer 32. Moreover, lost is the multiplier 13 on an output side of the memories 10, and furnished on the side of the display unit 6 are units such as the memories 10. The multiplier 30 is a means for performing a simple added averaging. The composer 32 carries out addition of a result of this simple added averaging and an immediately preceding reconstructed image $r_i$. An output of the composer 32 is sent to the displaying image memory 28, and in addition, after undergoing data weight imposing ($W_2$) by means of the multiplier 31, is stored in the memory 33 for performing calculation of a next reconstructed image $r_{i+1}$. By the way, there is the following relationship between the weights $W_1$ and $W_2$: $W_1+W_2=1$. If a value of $W_2$ is increased, an extent in which an image is averaged through the averaging with the preceding image is enhanced, but there appears many afterimages. Accordingly, there is need of adjusting values of $W_1$ and $W_2$, paying attention to the quality of the image.

This configuration is a recursively connected mechanism resulting from the simple added averaging. This brings about an advantage that it is enough to prepare just two weights, i.e. $W_1$ and $W_2$.

Figure 7A:
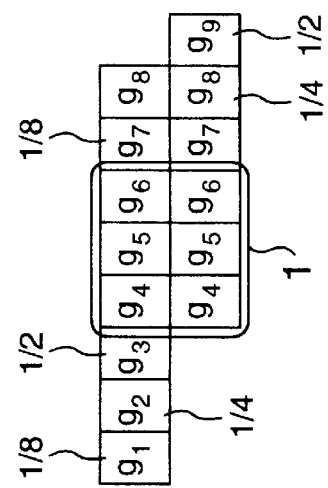
FIGS. 7A through 7C are diagrams showing still other embodiments of weight coefficients set in the X-ray CT apparatus according to the present invention.
Figure 7B:
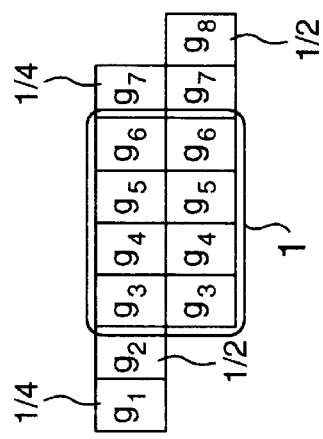
Figure 7C:
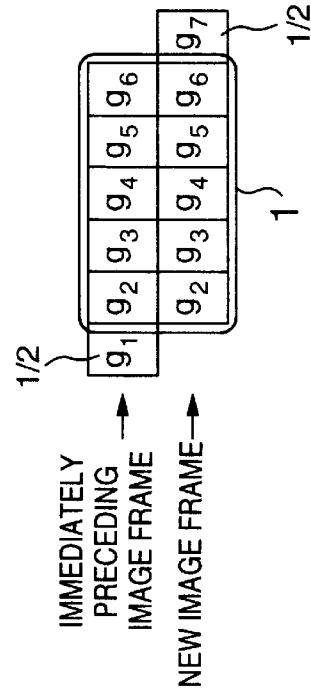

Described below, using FIGS. 7A to 7C, is an operation of the configuration in FIG. 6. In FIGS. 7A to 7C, the upper case shows content of the memory 33, representing an immediately preceding image frame. The lower case shows an output of the multiplier 30, representing a new image frame consisting of a plurality of newly constructed partial reconstructed images.

First, as an initial setting, the weights are set to be $W_1=1$ and $W_2=\frac{1}{2}$. At this time of initial setting, the memory 33 has been cleared. Then, measurement sequence is started. Partial reconstructed images $g_1$, $g_2$, $g_6$ in a range of 0° to 30°, 30° to 60°, . . . , 150° to 180° are sent to sequence of the measurement one after another and stored in #1, #2, . . . , and #6, respectively, following the order in which the measurements have been carried out. Next, the images, i.e. $g_1$ to $g_6$ are read out, added by the composer 25, then being transferred into the multiplier 30. Since $W_1 =1$, an added image of the images $g_1$ to $g_6$, i.e. an image obtained by adding the images $g_1$ to $g_6$, is inputted into the composer 32 without suffering any change. At this step, since content of the memory 33 has been already cleared, an output from the composer 32 becomes equal to an output from the above-mentioned multiplier 30 without suffering any change. This output is a normal reconstructed image $r_1$. The image $r_1$ is sent to the side of the memory 28, and at the same time is stored in the memory 33 through the multiplier 31. Since $W_2=\frac{1}{2}$, the reconstructed image $r_1$ is converted into the one-half thereof so as to be stored in the image memory 33. At the time of the first sheet display, too, it is allowable to employ a fixed weight, which is represented by $W_1=W_2=\frac{1}{2}$, for the purpose of embodying characteristics such as the high-speeding image reconstruction.

Next, in entering a process of obtaining a second reconstructed image $r_2$, the weight coefficients are set to be $W_1=W_2=\frac{1}{2}$. First, parallel beam data in a range of 180° to 210° and a partial reconstructed image $g_7$ based thereon are calculated by the reconstructing arithmetic unit 11, then being stored in #1 of the memories 10. The image $g_1$, which was stored previously in #1 of the memories 10, has been reset up to this time, and thus only the new image $g_7$ is stored in #1. Then, the images $g_7$, and $g_2$ to $g_6$ in #1 to #6 are read out, added by a composer 25, then being divided by 2 by the multiplier 30. The composer 32 adds an output from the multiplier 30 to an output from the memory 33 (#7) (which is equal to one-half a value of the preceding reconstructed image $r_1$) (refer to FIG. 7A), thereby obtaining the second reconstructed image $r_2$. The image $r_2$ is sent to the memory 28, and in addition, after being converted into the one-half thereof by the multiplier 31, is stored in the memory 33 (#7) instead of the preceding reconstructed image $r_1$ for performing calculation of a next reconstructed image $r_3$. In order to calculate the following reconstructed images including the next reconstructed image $r_3$, it is all right to leave the setting (i.e. $W_1=W_2=\frac{1}{2}$) unchanged. Namely, there is no need of varying the weights.

According to the above-described operation, since the partial reconstructed images $g_2$ to $g_6$ are contained in common with the first and the second images, as shown in FIG. 7A, it turns out that only $g_1$ and $g_7$ have undergone one-half of weight imposing. When obtaining the second reconstructed image $r_2$, as shown in FIG. 7B, it turns out that, as is the case with FIG. 7A, $g_1$ and $g_7$ have undergone one-fourth of weight imposing. When obtaining the third reconstructed image $r_3$, as shown in FIG. 7C, it turns out that $g_1$ and $g_7$ have undergone one-eighth of weight imposing. This means that the images are getting attenuated gradually. Similarly, concerning the combination of $g_2$ and $g_8$ and the combination of $g_3$ and $g_9$, the images are getting attenuated sequentially. Furthermore, in FIG. 7B, it turns out that $g_2$ and $g_8$ being in an opposing relationship to each other have undergone one-half of weight imposing. In FIG. 7C, it turns out that $g_3$ and $g_9$ being similarly in an opposing relationship to each other have undergone one-half of weight imposing. Namely, the data being in an opposing relationship to each other are averaged by adding the recursive filter to the 180° amount of reconstructed images. This eventually makes it possible to reduce the artifact or the noise.

Incidentally, although, in FIG. 6, the multipliers for multiplying by the weight coefficients are not provided on the output sides of the memories 10, i.e. #1 to #6, they may be provided on all the output sides of #1 to #6 as is shown in FIG. 1. It is also allowable to provide them on the output side of the memory 33. Also, in the embodiments in FIGS. 1 and 6 and in the above-mentioned modifications, it is possible to arbitrarily set each of the weights in correspondence with the resultant reducing effect of the artifact or the noise.

Figure 8A:
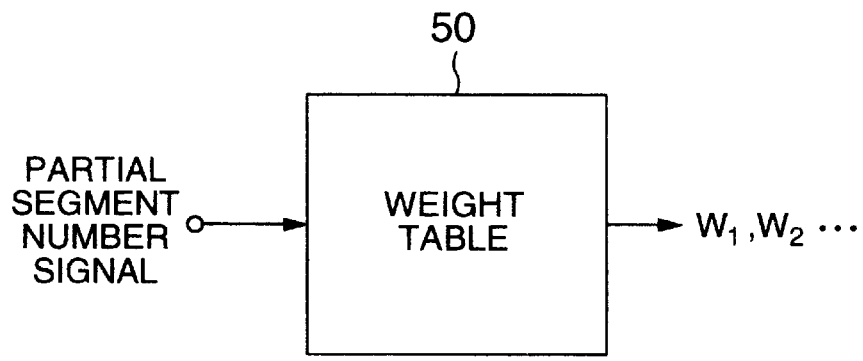
FIGS. 8A and 8B are diagrams showing embodiments of weight tables according to the present invention.
Figure 8B:
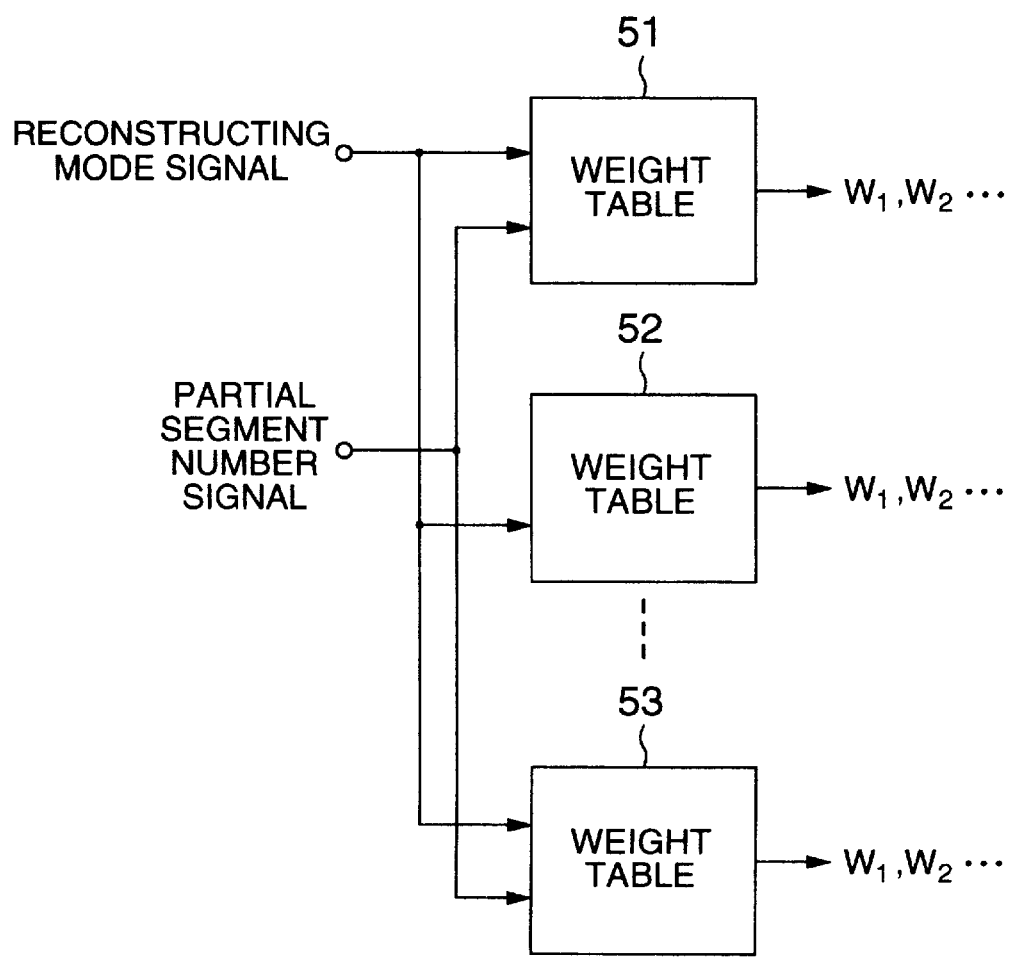

FIGS. 8A and 8B shows configuration diagrams of a weight setting unit. The weight setting unit is a circuit for determining weight coefficients for each of the multipliers 13, 31, 32, and so on. FIG. 8A shows an embodiment comprising a unit of weight table 50. The weight table 50 is a memory which, taking partial segment numbers as addresses, stores as data the weight coefficients $W_1$, $W_2$, . . . corresponding to each of the numbers. The partial segment numbers, which are defined in such a manner that the number 1 is the one corresponding to a segment in a range of 0° to 30°, the number 2 is the one corresponding to a segment in a range of 30° to 60°, . . . , can be obtained immediately from a management signal of the scanner or through such equipment as an encoder.

FIG. 8B shows an embodiment having weight tables 51, 52, . . . , 53 which correspond to a reconstructing mode. For example, the configuration is arranged in such a manner that the table 51 is a memory for performing the operation in FIG. 2A, the table 52 is a memory for performing the operation in FIG. 2B, . . . , and the table 53 is a memory for performing the operation in FIG. 3A. Consequently, one of the tables 51, 52, . . . , 53 is selected using a reconstructing mode signal (which is set using an input setting, and is any of selection specifying signals in FIGS. 2A, 2B, 3A, 3B, and 3C), and the address is selected using a partial segment number signal (which is set in such a manner that, in the segment of 30°, the number 1 corresponds to a segment in a range of 0° to 30°, the number 2 corresponds to a segment in a range of 30° to 60°, . . . , and, in a segment of 60°, the number 1 corresponds to a segment in a range of 0° to 60°, the number 2 corresponds to a segment in a range of 60° to 120°, . . . ), then reading out the corresponding weight coefficients $W_1$, $W_2$, . . . . It is needless to say that the number of the weight coefficients differs, depending on the embodiments. For example, in the embodiment in FIG. 6, the number is just two, i.e. $W_1$ and $W_2$, whereas in the embodiment in FIG. 1, the number is six, i.e. $W_1$ to $W_6$.

Furthermore, the present invention is not limited to the embodiments disclosed above. A variety types of modifications within the scope of the following claims are included in the present invention.

What is claimed is:

1. An X-ray CT apparatus for shifting, sequentially by a predetermined angle, a reconstructed image for a projection angle in a predetermined range so as to obtain a continuous reconstructed image, comprising:

a storage unit for dividing a group of parallel beam projection data, which is obtained by converting fan beam measurement data into parallel beam, into segments at a predetermined projection angle so as to store a plurality of partial reconstructed images each of which corresponds to each of the partial segments, a plurality of multipliers for multiplying each of said plurality of partial reconstructed images by each of predetermined weight coefficients, and a composer for composing outputs of said plurality of multipliers so as to obtain a normal reconstructed image.

2. The X-ray CT apparatus as claimed in claim 1, wherein said storage unit includes a memory for sequentially selecting a plurality number of images out of the continuous partial reconstructed images so that a portion of the partial reconstructed images overlap therewith and storing the plurality number of images.

3. The X-ray CT apparatus as claimed in claim 2, wherein said plurality of multipliers for multiplying by the weight coefficients includes weight coefficients which are set so that a summation of weight coefficients for partial reconstructed images the view angles of which are in an opposing relationship to each other is equal to a summation of weight coefficients for the other partial reconstructed images.

4. The X-ray CT apparatus as claimed in claim 1, wherein said storage unit includes a memory for storing each of a plurality of partial reconstructed images corresponding to 180° amount of projection data.

5. An X-ray CT apparatus, comprising:

a fan beam-parallel beam converter for turning a fan beam X-ray source continuously at least 2 or more of turns and converting fan beam measurement projection data, which is obtained sequentially by the turns, into parallel beam data, an arithmetic unit for dividing an output from said fan beam-parallel beam converter so as to construct each of partial reconstructed images for each of the segments, a storage unit for sequentially selecting a plurality number of images out of said continuous partial reconstructed images so that a portion of the partial reconstructed images overlap therewith and storing the plurality number of images, a plurality of multipliers connected on an output side of said storage unit for multiplying said plurality number of stored partial reconstructed images by weight coefficients, and a composer for composing outputs from said multipliers so as to obtain a normal reconstructed image.

6. The X-ray CT apparatus as claimed in claim 5, wherein said arithmetic unit includes a means for constructing each of said partial reconstructed images for each of N units of the segments into which 180° amount of projection data is divided, said plurality of multipliers includes weight coefficients which are set so that a summation of weight coefficients for partial reconstructed images the view angles of which are in an opposing relationship to each other is equal to a summation of weight coefficients for the other partial reconstructed images, and said composer includes a means for constructing said normal reconstructed image with the use of N+α units of said partial reconstructed images.

7. An X-ray CT apparatus, comprising:

a storage unit for dividing 180° amount of parallel beam projection data, which is obtained by converting fan beam measurement data into parallel beam data, into segments at a predetermined projection angle and storing a plurality of partial reconstructed images each of which corresponds to each of the partial segments, a frame memory for storing an immediately preceding image frame, a first multiplier for imposing weights on a plurality of newly constructed partial reconstructed images, a second multiplier for imposing a weight on said immediately preceding image frame, and a composer for composing said immediately preceding image frame on which the weight has been imposed and said plurality of newly constructed partial reconstructed images so as to obtain a normal reconstructed image, said first and second multipliers including means for imposing weights so that a summation of weights for partial reconstructed images the view angles of which are in an opposing relationship to each other becomes equal to 1.

8. An X-ray CT apparatus for shifting, sequentially by a predetermined angle, a reconstructed image for a projection angle in a predetermined range so as to obtain a continuous reconstructed image, comprising:

a means for obtaining, of parallel beam projection data obtained by converting fan beam measurement data into parallel beam data, m units of partial reconstructed images corresponding to a predetermined projection angle, a weight-imposing means for imposing weights on said m units of partial reconstructed images, a composing means for adding said m units of weight-imposed partial reconstructed images so as to reconstruct one image, and a means for displaying said reconstructed image, said composing means including a means for obtaining a continuous reconstructed image from said partial reconstructed images obtained by shifting said predetermined projection angle by $\alpha°$.

9. The X-ray CT apparatus as claimed in claim 8, said weight-imposing means including a means which, for a predetermined partial reconstructed image, changes a weight coefficient to be imposed and then imposes the changed weight coefficient thereon.

10. The X-ray CT apparatus as claimed in claim 8, said means for obtaining partial reconstructed images including a means for setting an angle exceeding 180° as said predetermined projection angle.

11. An image reconstructing method which employs an X-ray CT apparatus for shifting, sequentially by a predetermined angle, a reconstructed image for a projection angle in a predetermined range so as to obtain a continuous reconstructed image, comprising the steps of:

dividing parallel beam projection data, which is obtained by converting fan beam measurement data into parallel beam data, into segments at a predetermined projection angle so as to obtain a plurality of partial reconstructed images each of which corresponds to each of the partial segments, multiplying each of said plurality of partial reconstructed images by each of predetermined weight coefficients, and composing said plurality of partial reconstructed images, which have been multiplied by the weight coefficients, so as to obtain one reconstructed image.

12. The image reconstructing method as claimed in claim 11,
wherein said step of obtaining the plurality of partial reconstructed images includes a step of
sequentially selecting a plurality number of images out of the continuous partial reconstructed images so that a portion of the partial reconstructed images overlap therewith and transferring the plurality number of images to said step of multiplying by the weight coefficients.

13. The image reconstructing method as claimed in claim 12,
wherein said step of multiplying by the weight coefficients includes a step of setting the weight coefficients so that a summation of weight coefficients for partial reconstructed images the view angles of which are in an opposing relationship to each other is equal to a summation of weight coefficients for the other partial reconstructed images.

14. The image reconstructing method as claimed in claim 11,
wherein said step of obtaining the plurality of partial reconstructed images includes a step of obtaining a plurality of partial reconstructed images corresponding to 180° amount of projection data.

15. The image reconstructing method as claimed in claim 14,
wherein said step of composing the plurality of partial reconstructed images so as to obtain one reconstructed image includes a step of composing a plurality of partial reconstructed images corresponding to 180+α° amount of projection data so as to obtain one reconstructed image.

16. An image reconstructing method which employs an X-ray CT apparatus for shifting, sequentially by a predetermined angle, a reconstructed image for a projection angle in a predetermined range so as to obtain a continuous reconstructed image, comprising:
a step of dividing 180° amount of parallel beam projection data, which is obtained by converting fan beam measurement data into parallel beam data, into segments at a predetermined projection angle so as to obtain a plurality of partial reconstructed images each of which corresponds to each of the partial segments,
a first weight multiplying step of imposing first weights on a plurality of newly constructed partial reconstructed images,
a second weight multiplying step of imposing a second weight on said immediately preceding image frame, and
a step of composing said immediately preceding image frame, on which the first weight has been imposed, and said plurality of newly constructed partial reconstructed images, on which the second weights have been imposed, so as to obtain a normal reconstructed image,
wherein said first and second weight multiplying steps respectively include steps of setting said first weights and said second weight so that a summation of weights for partial reconstructed images the view angles of which are in an opposing relationship to each other becomes equal to 1.

17. An image reconstructing method which employs an x-ray CT apparatus for shifting, sequentially by a predetermined angle, a reconstructed image for a projection angle in a predetermined range so as to obtain a continuous reconstructed image, comprising the steps of:
obtaining, of parallel beam projection data obtained by converting fan beam measurement data into parallel beam data, m units of partial reconstructed images corresponding to a predetermined projection angle,
imposing each of predetermined weights on each of said m units of partial reconstructed images, and
adding said m units of weight-imposed partial reconstructed images so as to reconstruct one image.

18. The image reconstructing method as claimed in claim 17,
wherein said step of obtaining the partial reconstructed images includes a step of obtaining said m units of partial reconstructed images every time said projection angle is shifted by α°.

19. The image reconstructing method as claimed in claim 18,
wherein said step of obtaining the partial reconstructed images includes a step of obtaining said m units of partial reconstructed images from parallel beam projection data corresponding to a projection angle exceeding 180°.

* * * * *